United States Patent [19]
Engbersen et al.

[11] Patent Number: 6,058,119
[45] Date of Patent: May 2, 2000

[54] SDH/SONET INTERFACE

[75] Inventors: Antonius P. Engbersen, Armonk, N.Y.; Andreas Herkersdorf, Adliswil, Switzerland; Wolfram Lemppenau, Bocholt, Germany; Hans R Schindler, Langnau, Switzerland

[73] Assignee: International Business Machines Corporation, Armonk, N.Y.

[21] Appl. No.: 08/930,837
[22] PCT Filed: Apr. 15, 1995
[86] PCT No.: PCT/EP95/01426
   § 371 Date: Oct. 7, 1997
   § 102(e) Date: Oct. 7, 1997
[87] PCT Pub. No.: WO96/33563
   PCT Pub. Date: Oct. 24, 1996
[51] Int. Cl.[7] .................................................. H04J 3/16
[52] U.S. Cl. ......................... 370/466; 370/907; 370/503
[58] Field of Search ...................................... 370/465, 466, 370/503, 505, 516, 517, 537, 539, 907

[56] References Cited

U.S. PATENT DOCUMENTS

| | | | |
|---|---|---|---|
| 5,206,858 | 4/1993 | Nakano et al. | 370/465 |
| 5,907,682 | 5/1999 | Miyazawa | 395/200.6 |

FOREIGN PATENT DOCUMENTS

| | | | |
|---|---|---|---|
| 5-268180 | 10/1993 | Japan | H04J 3/00 |
| 5-292556 | 11/1993 | Japan | H04Q 3/52 |
| 07095182 | 4/1995 | Japan | H04L 1/00 |

*Primary Examiner*—Chi H. Pham
*Assistant Examiner*—Maikhanh Tran
*Attorney, Agent, or Firm*—John D. Flynn

[57] ABSTRACT

A modular approach to the mapping of data in and from a standard SDH/SONET signal is described. A module has interfaces (T0–T8) which allows to connect to it to other of its kind and thereby achieving higher data rates, i.e. access to standard signals of higher levels. By choosing among different interconnection schemes, arrangements comprising a plurality of modules are also able to support concatenated data traffic.

5 Claims, 10 Drawing Sheets

SDH/SONET INTERFACE

The present invention concerns a module which may be used singly or in combination with other like modules to provide an interface circuit into and out of SONET/SDH-standard signals. The invention also concerns a SONET/SDH interface circuit employing one or more such modules. The module of the present invention can take the form of an application specific integrated circuit.

BACKGROUND OF THE INVENTION

The American National Standards Institute has recently established a new basic standard for high-speed, multiplexed digital data transmission. This is the "synchronous optical network" standard, henceforth referred to as SONET. The SONET standard specifies optical interfaces, data rates, operation procedures and frame structures for multiplexed digital transmission via fiber optic networks.

The International Telecommunications Union (ITU) has adopted the interface principles of SONET and recommended a new global transmission standard for high-speed digital data transmission. This standard is the "synchronous digital hierarchy" (SDH).

For an account of the SDH standard, reference should be made to the report entitled "REPORT OF Q.22/15 MEETING" from "STUDY GROUP 15" of the ITU International Telecommunication Standardization Sector, bearing the document number "Temporary Document 62(3/15)" and the date "Geneva, May 16–27, 1994".

The SDH standard is designed to enable manufacturers to develop telecommunications equipment which:
 a) will be interchangeable in all telecommunication networks built around the world to its standard; and which
 b) is backwards compatible, i.e. can be used with data which is in the older telecommunications formats used in N.America, Europe and Japan.

This is achieved by a complex hierarchy of so-called "Containers" (C) and "Virtual Containers" (VC), see FIG. 1. The container, e.g. C-4, C-3, C-12, etc., are information structures designed to accommodate data traffic with specific transmission rates. The C-4 carries traffic with a base rate of up to 139 264 kbit/s, the C-3 container carries either up to 44 736 or 34368 kbit/s, etc. The containers are turned into virtual containers by adding Path OverHead information (POH) to it. By procedures defined as multiplexing, mapping, or aligning, data structures are generated which are constitutive to the SDH. These data structures are named "Administrative Unit Groups" (AUG) and "Synchronous Transport Module" (STM). The label of an STM is defined by the number of AUGs it carries: a STM-4 contains for example four AUGs. An AUG contains either one "Administration Units" (AUs) of type 4 or three AU-3. Referring to the simplest cases, in turn one AU-4 contains one C-4 signal and one AU-3 carries one C-3 signal.

The SDH/SONET data frames, i.e., the STM-N signals, are 125 micro-seconds long. The amount of data transmitted in each frame depends on the hierarchy level N of the signal. The higher hierarchical levels are transmitted at higher data rates than the basic STM-1 level of approximately 155 Mbit/s. (The exact transmission rate is defined as 155.52 Mbit/s. However here and in the following transmission rates are often denoted by their approximate values. This in particular due to the fact that the exact data transmission rates are distorted by overhead data traffic and idle cell stuffing.) The integer N indicates how many times faster the data is transmitted than in the STM-1 level. For example STM-4 denotes a data transmission rate of 622 Mbit/s, whereby each data frame contains four times as many bytes as does a frame of STM-1. The highest defined level is STM-64, which has a data rate of 9.95 Gb/s. Clearly, each part of the STM-N signal is broadcast in the same time as the corresponding part of an STM-1 signal, but contains N times as many bytes.

The STM-1 signal, as shown in FIG. 2, contains an information rectangle of 9 rows with 270 bytes/row corresponding to a SONET/SDH data rate of 155.52 Mbit/s. The first 9 bytes/row represent the "Section OverHead", henceforth SOH. The remaining 261 bytes/row are reserved for the VCs, which in FIG. 1 is a VC-4. The first column of a VC-4 container consists of the "Path Overhead" (POH). The rest is occupied by the payload (a C-4 signal). Several VCs can be concatenated to provide a single transmission channel with a corresponding bandwidth. For example, four VC-4 in a STM-4 signal can be concatenated to form single data channel with approximately 600 Mbit/s capacity: in this case the four VC are referred to in the standard terminology as VC-4-4c and the signal as STM-4c.

This flexibility of the SDH standard is partly due to the pointer concept: In SDH, the frames are synchronized, but the VCs within them are not locked to the frames. So the individual containers of the SDH signals do not have to be frame aligned or synchronized amongst each other. A "pointer" is provided in the Section Overhead which indicates the position of the above introduced POH, i.e., the start of a virtual container in the SDH frame. The POH can thus be flexibly positioned at any position in the frame. The multiplexing of information into higher order SDH frames becomes simpler than in the old data standards, and an expensive synchronization buffer is not required in SDH. Similarly, lower order signals can be extracted out of and inserted into the higher order SDH signals without the need to demultiplex the entire signal hierarchy. The pointers are stored in the fourth row of the Section Overhead.

The Section Overhead is further subdivided into: (i) The "Regenerator Section Overhead" or RSOH. This contains bytes of information which are used by repeater stations along the route traversed by the SONET/SDH Signal. The Regenerator Section Overhead occupies rows 1–3 of the Section Overhead. (ii) The "Multiplexer Section Overhead" or MSOH. This contains bytes of information used by the multiplexers along the SONET/SDH signal's route. The Multiplexer Section Overhead occupies rows 5–9 of the Section Overhead. These sections of the overhead are assembled and dissembled at different stages during the transmission process. FIG. 2 also shows an exploded view of the MSOH.

In the parallel SONET system, a base signal of 51.84 Mbit/s is used. It is called the Synchronous Transport Signal level 1, henceforth STS-1. This has an information rectangle of 9 rows with 90 bytes/row. The first three bytes/row are the section overhead and the remaining 87 bytes/row are the "synchronous payload envelope", henceforth SPE. Three of these SPEs fit exactly into one Virtual Container-4. Thus signals in the STS-1 signal format can be mapped into an STM-1 frame. Furthermore, frame aligned STS-1 or STM-1 signals can be multiplexed into higher order STM-N frames.

In general, any lower data rate signal which is combined with other such signals into new data frames of higher rate is referred to as a "tributary" signal. For example in the previous paragraph, the three STS-1 signals which are combined into one STM-1 signal are tributary signals. It may be noted that the scope of the term tributary in this description exceeds the standard definition, as it is also used to describe the inter-level signal mapping in SDH.

The present invention relates to a data processing module for mapping data, i.e. tributaries, into and out of the SDH/SONET formats. The data processing achieved with the present invention concerns in particular the compilation of data which is at relatively low data rates into standard data frames of relatively high data rate, and vice-versa.

Some manufacturers have already put data processing modules on the market which conform to the SDH/SONET standards. Amongst these prior art arrangements are a number of electro-optical transceiver modules designed by large carrier operating companies or their suppliers to connect the existing proprietary equipment to SONET/SDH. Other companies, mainly chip manufacturers offer SONET/SDH processor ASICs or chip sets, which interface tributary signals to signals in the STM-1 format. The chip family provided by PMC SIERRA and known as PM53XX family may exemplify such a set. The known sets have severe disadvantages, which prevent a truly modular approach as achieved by the current invention. The chip used for mapping ATM 155 Mbit/s traffic into a STM-1 signal combined with three other chips of its kind is not sufficient (and with an appropriated interconnection) to generate a STM-4 signal. The known arrangement of transceivers requires an additional complex and expensive chip which multiplexes the tributaries into the STM signal and derives those part of the SOH and POH which relate to the whole frame or to a whole container, e.g. the POH byte B3 and the SOH byte B1. Additionally, certain functions in the four chips must be disabled to allow them to be combined, and these prevent each from functioning any longer as an STM-1 interface. Further, the arrangement can only interface separate incoming data signals, e.g. ATM 155 Mbit/s signals, to STM-4. It fails when having to map a single incoming data stream, such as the ATM 622 Mbit/s data signal, to an STM-4c signal.

In summary, the available prior art SONET/SDH interface ASICs are primarily intended to interface signals to one particular STM-N level. Dedicated and expensive chips are used in the rare cases where a partially modular approach into higher levels of the SDH hierarchy is attempted. Another example representing the known devices is described in the U.S. Pat. No. 5,257,261. In this patent, apparatus and methods for concatenating a plurality of lower level SONET signals into higher level SONET signals are provided. In the described arrangement of at least three lower level signal processing apparatus, one of which serving as master apparatus, a specific byte of the POH (J1 byte) is used to synchronize the reading of the data stream of each apparatus. The apparatus is capable of calculating the B3 byte, which is a parity check byte calculated over all bits of the VC of the previous SONET/SDH signal. Each lower level apparatus is connected to its adjacent apparatus by one bus to transmit a J10Rcomposite signal, one bus for the J1ANDcomposite signal, one bus for the (receive) rxJ1 signal, and further two busses by which the master apparatus issues receive (rxSPE) and transmit (txSPE) signals to coordinate the reception and transmission of SPEs, which correspond within the SONET standard to the above described VCs. For the calculation of the B3 byte in the reception mode and in the transmission mode, adjacent apparatus are connected by an additional pair of lines.

In view of the known prior art, it is object of the current invention to provide a apparatus for generating SONET/SDH compliant signals out of arbitrary tributaries. Arrangements of this apparatus should be scalable to any level of the above standards restricting the additional amount of interconnection and hardware within such an arrangement to what can be regarded as being absolutely necessary.

SUMMARY OF THE INVENTION

The objects of the invention are achieved by an apparatus as set forth by the appended claims. The new apparatus is characterized by being applicable to all currently defined levels of the Synchronous Optical Network (SONET) and the Synchronous Digital Hierarchy (SDH), for example STS-1, STM-1, STM-4, STM-16, and STM-64 etc., when being combined with others of its kind. In this combination, it also can serve concatenated data traffic, which are currently defined for example as STS-3c, STM-4c, STS-12c, and STM-16c etc. signals. In the sequel, whenever we refer to a signal of the SDH hierarchy we imply that an equivalent statement holds true for a signal of the SONET hierarchy. Such improvements with respect to the art are accompanied by a significant increase in modularity: Less additional hardware and horizontal connections are required to adapt the new apparatus to a different signal level. Furthermore, there is only one part number for implementing SONET/SDH processors operating at any defined signal rate.

In accordance with the invention, the base module in its transmission (Tx) version comprises a POH insertion section, a SOH and AU-pointer insertion section, and a scrambling section. Further, the base module comprises means for calculation all POH and SOH bytes as required by the SDH/SONET standard, particularly those bytes which are used for error monitoring, i.e. the B1, B2, and B3 bytes. The receive (Rx) version of the base module comprises a frame delineation section, a descrambling section, an SOH extraction section including a B1 and B2 verification section, and a POH extraction section including a B3 verification section. Obviously, the functional sections of the Tx and Rx module mirror each other at least to a large extend.

The functional sections as described above are all set forth in the relevant ITU standard recommendation (G series). They are thus no particular concern of the current invention. The accurate functioning of these sections guarantees that a data stream, for example an OC-3/ATM cell stream, is mapped properly into a STM-1 signal and that, vice versa, a STM-1 signal can be transformed back into a clear data stream. In the following, this mapping or transformation process will be sometimes referred to as "vertical" signal or data flow in contrast to the "horizontal" signal flow which is to occur between adjacent modules in the combinations as described below.

The interfaces provided for the horizontal signal flow, i.e., the data which are exchanged between several of the above described base module, might be regarded as the characteristic features of the invention. The main part of these interfaces is formed by first switching means with two possible input connections and two possible output connections. In a stand-alone mode, i.e. when mapping to and from the STM-1 signal, the switch connects the B3 calculation section to the POH section. When the base module is used in combination with other base modules, i.e., when mapping to and from higher signal levels of the concatenated type (STM-Nc), the B3 switching means is configured differently depending on the position of the module among the others. A second interface includes second switching means which also have two possible input connections and two possible output connections. As a matter of course, the width of the interface depends on whether the data and/or control signals are transmitted in parallel or through a multiplexer.

In a stand-alone mode, i.e. when mapping to and from the STM-1 signal, the switch connects the B1 calculation section to the POH section. When the base module is used in combination with other base modules, i.e., when mapping to and from higher signal levels (STM-N and STM-Nc), the B1 switching means is configured differently depending on the position of the module among the others. Both the B1 and B3 switching means can be implemented in various manners by hardware and software means.

In combination, the base modules form an arrangement, which is synchronized via a synchronization port, through which the system clock signal and a frame sync signal are transmitted and received. The system or bit clock is preferably recovered from a SDH/SONET signal. If no such signal is available, the bit clock can also be derived from internal oscillator circuits. The frame sync signal is preferably derived from the A1 and/or A2 bytes which according to the SONET/SDH standard appear at the beginning of a frame. With regard to the above-cited U.S. Pat. No. 5,257,261 it is worth noticing that the present invention does not contemplate to utilize bytes from within the payload of a frame, e.g. J1, to derive a synchronization signal. Hence, the current invention—in contrast to the known device—is fully compliant to the SONET/SDH standard. It is regarded as a further advantage of the invention that the clock rate at which each single module operates remains the same irrespective of whether the module is employed in a stand-alone mode or in an arrangement to map e.g. STM-4, STM-4c, STM-64, etc. signals.

In a preferred embodiment of the base module, the scrambling section is provided with interface to other base modules, enabling the horizontal exchange of coding sequences between adjacent modules. This variant of the base module enables the use of the base module for concatenated signals.

Another preferred embodiment comprises a ATM (Asynchronous Transfer Mode) adapter section, which in case of the transmit (Tx) version of the base module is basically a self-synchronized scrambler. Its generator polynomial preferably is $x^{43}+1$ according to the standard provision. In the (Rx) version, the scrambler is replaced by a descrambler based on the same polynomial. The ATM section preferably includes further means for stuffing bits or bytes into the data stream, and means to extract these stuffing information when transmitting the data to a following stage such that ATM cell payload scrambling can be done word-aligned. The 5 byte cell header is not to be scrambled. In case no cells are received from the user, complete idle cells are inserted (transmit direction) and removed (receive direction) respectively.

These and other novel features believed characteristic of the invention are set forth in the appended claims. The invention itself however, as well a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

MODE(S) FOR CARRYING OUT THE INVENTION

Figure 3A:
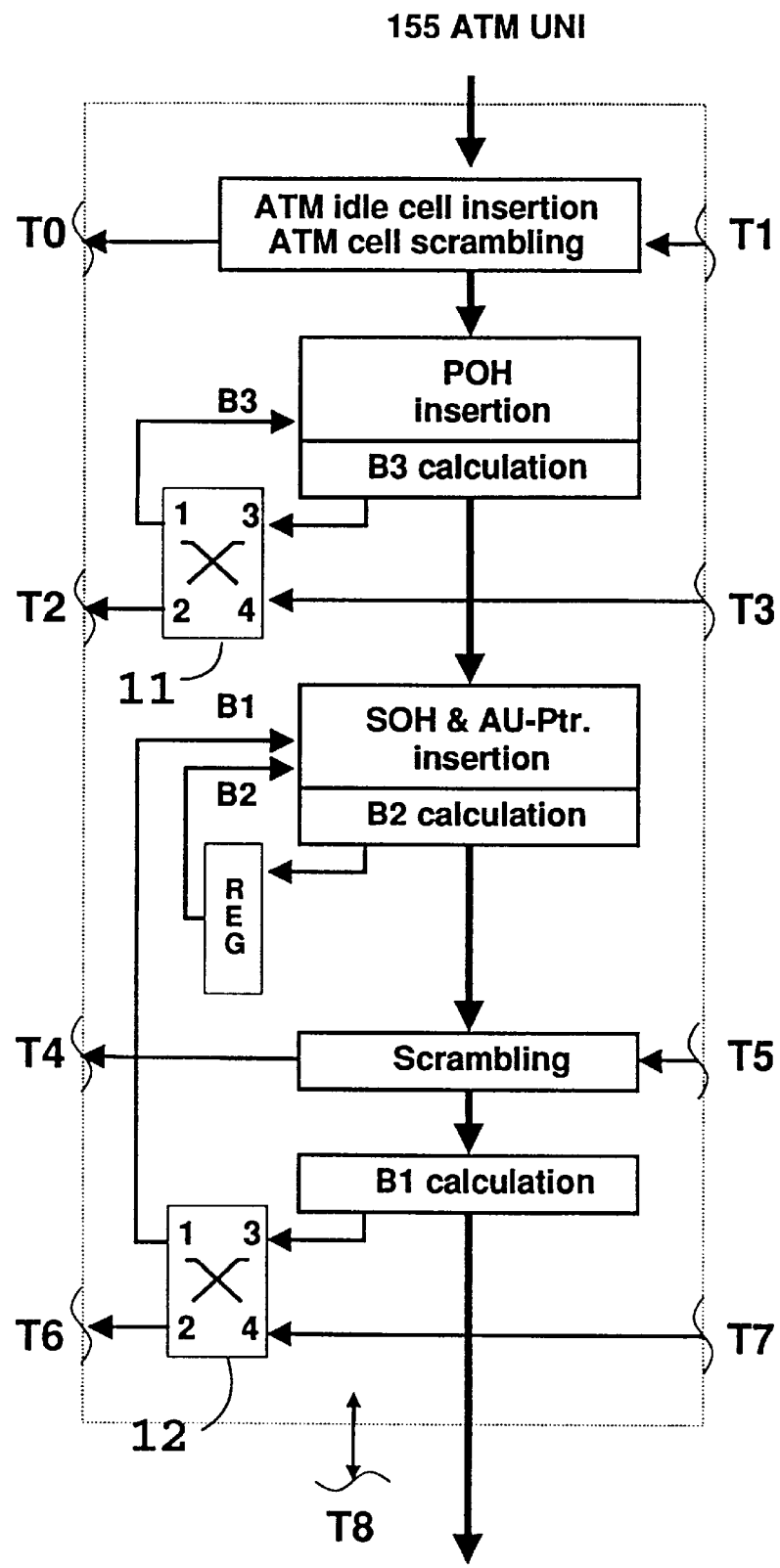
FIGS. 3A, 3B show a transmit (Tx) and receive (Rx) version, respectively, of a base module according to the invention.
Figure 3B:
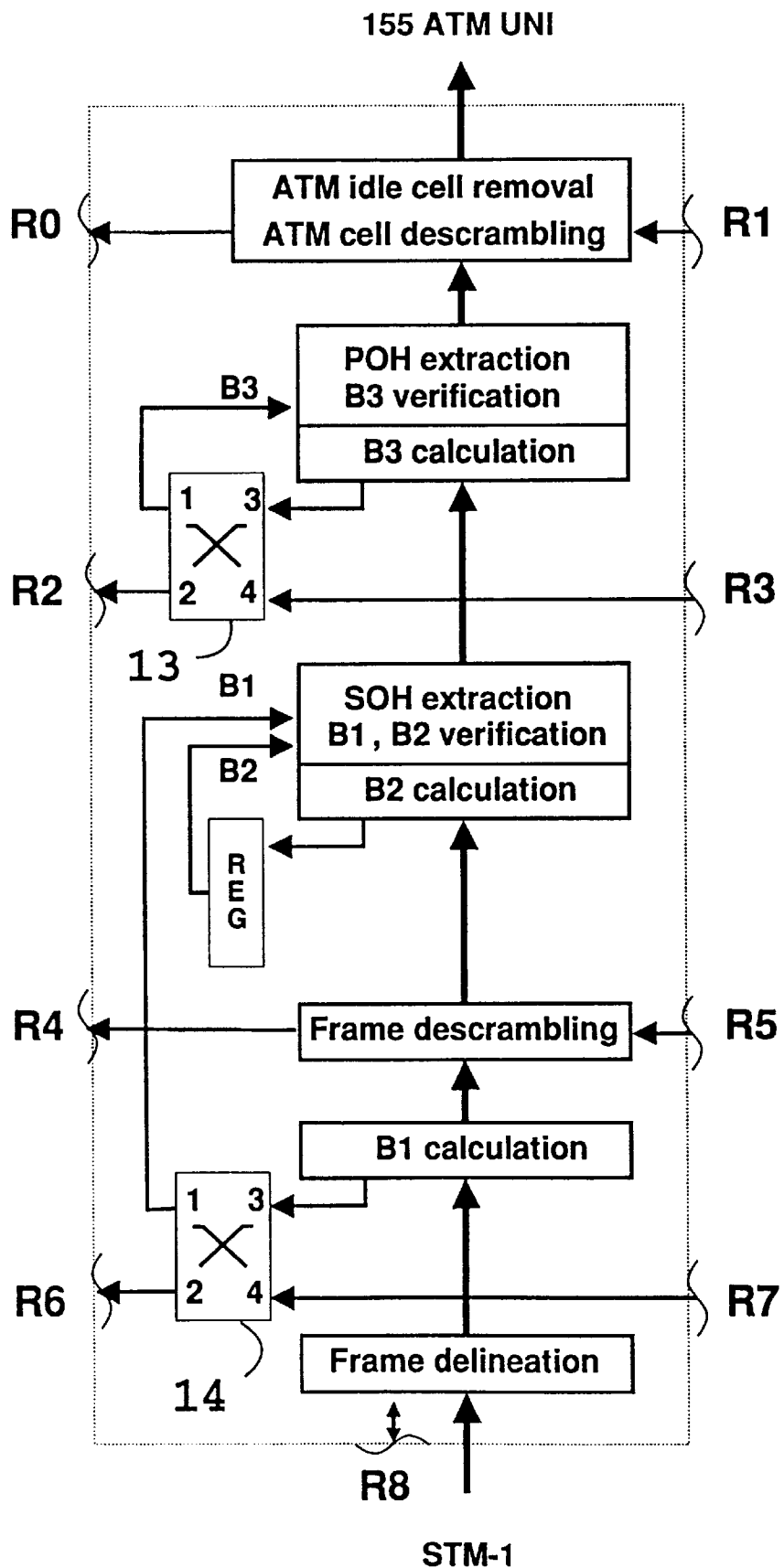

FIGS. 3A and 3B show examples of the module of the present invention. The module illustrated in FIG. 3A maps a 155 Mbit/s ATM cell stream, i.e., a signal in the ATM data format, into a SONET/SDH STM-1 signal in the transmit direction. The module illustrated in FIG. 3B maps the STM-1 signal of the SONET/SDH standard into a 155 Mbit/s ATM cell stream in the receive direction. As above, the transmit direction is denoted Tx, and the receive direction Rx. The modules of FIGS. 3A and 3B do not provide a change of data rate. Their function is to convert the format of the data. For the sake of convenience, the above data rates represent approximate values, which might be in reality further distorted by idle cells or bit stuffing.

If the module is to interface another tributary data stream, instead of the ATM cell stream, into and out of the STM-1 format, then:

(i) the "ATM idle cell insertion & cell payload scramble" function of the Tx module; and (ii) the "ATM idle cell discard & call payload descramble" function of the Rx module can be disabled, bypassed, or replaced by a corresponding section adapted to package the other data stream format into a STM-1 signal.

The modules shown in FIG. 3 also have their basic subfunctions indicated by the various functional blocks on the figure. The "frame delineation" function is required for the Rx module only. Other subfunction block of the Tx and Rx modules mirror each other, respectively.

Further details of the subfunctions performed by the blocks in FIG. 3 in accordance with the SONET/SDH standard can be found in the ITU standard recommendations (G series). These recommendations are known to anyone actively engaged in the relevant technical field and publicly available. Of particular interest are G.707, G.708, G.709, and G.70X, which is a summary of the previous ones, along with G.782, "Types and General Characteristics of Synchronous Digital Hierarchy (SDH) Equipment", Report COM XV-R 110-E; and G.783, "Characteristics of Synchronous Digital Hierarchy (SDH) Equipment Functional Blocks", Report COM XV-R 110-E, all of which hereby are declared part of the current description. Details of all current types of scrambling mechanisms are in addition extensively described for example by B. G. Lee and S. C. Lee in: "Scrambling Techniques for Digital Transmission," Springer Verlag, London 1994. The functions described in these standards and the basic subfunctions performed by the functional blocks in FIG. 3 are common to all SONET/SDH processor systems. A detailed description of those features of the embodiment would not provide additional information to those skilled in the art and may even distract from other relevant features of the invention and is therefore omitted, except for those features which are deemed to be helpful in explaining the (horizontal) information exchange between single modules in an arrangement.

The modules of FIG. 3 have, according to the invention, additional features beyond the basic subfunctions necessary to meet the above standards.

A first additional feature consists in a number of parallel and serial inter-module interfaces or ports. The interfaces are labeled on FIG. 3A as T0–T8 in the case of the transmitter and as R0–R8 on FIG. 3B in the case of the receiver.

The interfaces T0, T1 and R0, R1 are used in case that a concatenated ATM signal, e.g., ATM 622 Mbit/s traffic, is passed through an arrangement of several modules. Comprising mainly a self-sychronized type de-/scrambler, the ATM section of each module in principle needs access to the complete data stream. Further to the scrambling, the ATM section also provides the stuffing and destuffing functions necessary to achieve a word aligned input to the ATM scrambling section. The stuffing and destuffing functions as such are known in the art, and within this embodiment realized by introducing additional or less idle clock cycles when transmitting the data to the following section.

To perform these functions, access to the full data stream, i.e., N*8 bits, is required in front of and behind the cell scrambler. Avoiding a higher clock rate, a full N*8 bit signal has to be exchanged between the modules. Thus, T0, T1 are designed to receive and transmit 3*N*8 bits. For the receiver in the STM-4c case, interfaces R0 and R1 handle the same information flow for descrambling and depacking. As mentioned above, these numbers do not necessarily correlate with the bit width of the cell interfaces as these horizontal signals can be realized, e.g., either point-to-point (direct connection to neigbour only), either bus based (single-point-to-multipoint or multipoint-to-single-point), or switch-based (Nx8 bit switch).

Figures 4A, 4B:
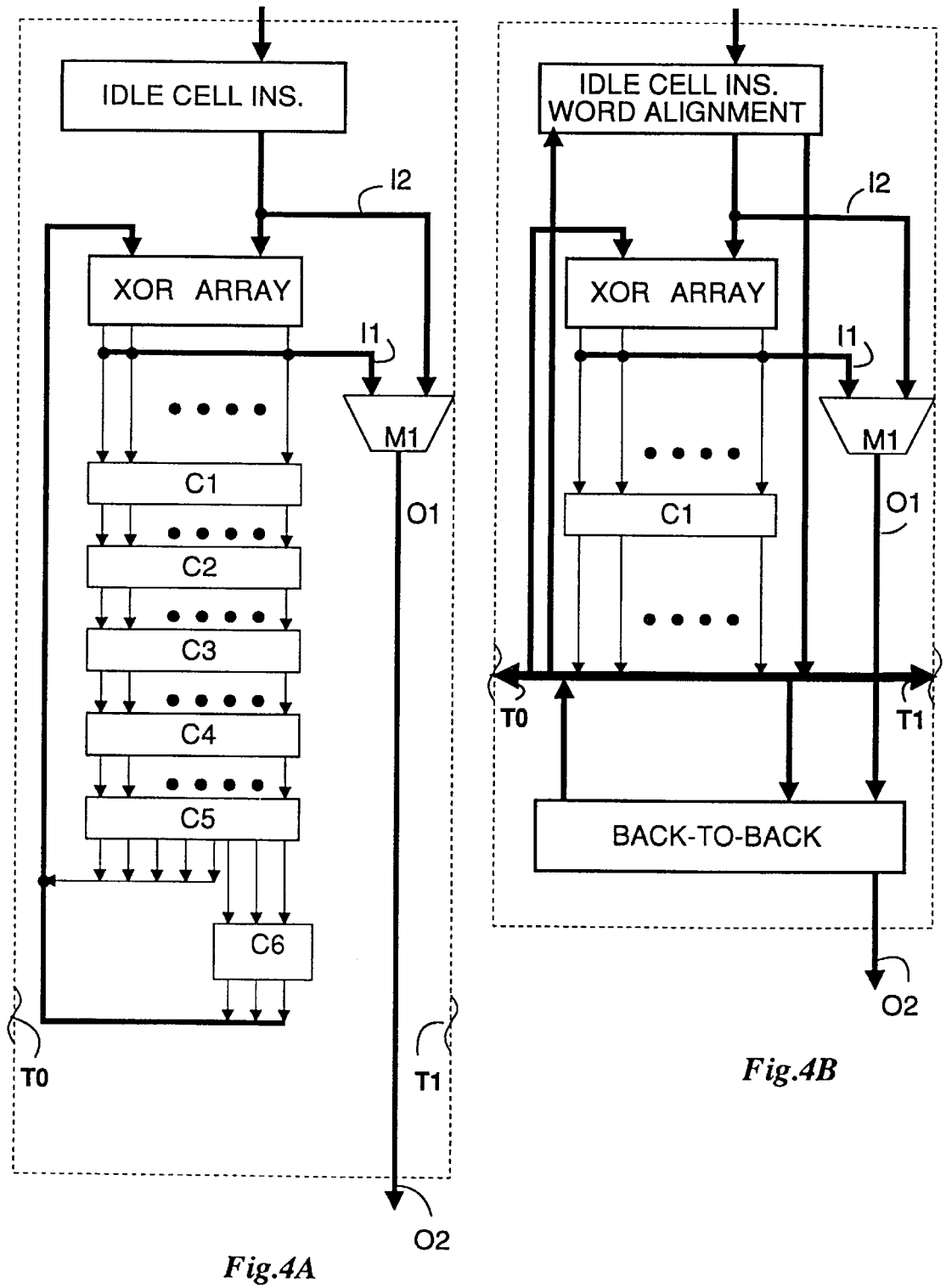
FIGS. 4A, 4B show details of the ATM section of the embodiment of FIGS. 3A and 3B

FIG. 4A shows details of the configuration of the ATM scrambling section as the Tx module operates in a stand-alone mode, i.e., as self synchronized scrambler for an 8 bit wide ATM cell stream. According to ITU recommendations, the cell header is not scrambled. Thus, it is output directly at port O2 via the multiplexer M1 (input port I2 connected to output O1, scrambler clocking disabled). The payload is scrambled by passing the XOR ARRAY (scrambler clocking enabled) and is finally output at port O2 via the multiplexer M1 (input port I1 connected to output O1). The register blocks C1 to C6 together with the feedback taken out from registers C5 and C6 back into the XOR ARRAY represent the parallel random sequence generation based on the generator polynomial $X^{43}+1$. Due to the nature of the self synchronized scrambler principle, only one presetting at the very beginning and no further periodic re-synchronization for the scrambler is needed.

FIG. 4B shows the configuration of the self-synchronized scrambler of a Tx module for a 32 bit ATM cell stream, which is distributed by multiplexing to four modules. The payload is word aligned to the data bus, as described above, the required stuffing may either succeed or precede the cell header. Again, the cell header is not scrambled and is finally output at O2 via the multiplexer M1 (input port I2 connected to output O1, scrambler clocking disabled). The payload is scrambled by passing the XOR ARRAY (scrambler clocking enabled) and is finally output at O2 via the multiplexer M1 (input port I1 connected to output O1) and after packing the cells back to back again (destuffing). To implement the polynomial $X^{43}+1$ for a 4×8 bit data bus width, the four modules are using a subset of the registers fully employed in the stand-alone case (FIG. 4A). Thus, two modules with one 8 bit register stage C1 (this configuration is shown in FIG. 4B), a third module with two cascaded 8 bit register stages (C1, C2 of FIG. 4A) and a fourth module with one 8 bit and one 3 bit cascaded register stages (C1, C6 of FIG. 4A) are used. For a considered module, the feedback into its XOR ARRAY is always taken from last register stages of the adjacent module. Therefore, all outputs of the last register stages of all modules are exchanged between all modules via T0 and T1.

Interfaces T2 (R2) and T3 (R3) are used to forward the individually collected and calculated B3 terms from one module to an adjacent module, see FIGS. 3A, 3B. These interfaces are connected to a switching logic 11 (13), which in the stand-alone mode transmits the output of the B3 calculation section to the POH insertion section (in the Tx module) or to the POH extraction/B3 verification section. In case that several modules are interconnected to an arrangement, the switching logic is a) at the "first" module switched to pass via interface T2 (R2) the output of the B3 calculation to the next module within the arrangement; b) at an intermediate module switched to perform an XOR operation, with one operand being the output of the internal B3 calculation section and the second operand being the input received via the interface T3 (R3), and passing on the result of this XOR operation via the interface T2 (R2); and c) at the last module of an arrangement switched to perform an identical XOR operation, however, transmitting the result to the POH insertion section or to the POH extraction/B3 verification section, respectively.

Interfaces T6 (R6) and T7 (R7) are used to forward the module individual collected and calculated B1-terms from one modules to an adjacent module. These interfaces are connected to a switching logic 12 (14), which in the stand alone mode transmits the output of the B1 calculation section to the SOH insertion section (in the Tx module) or to the SOH extraction/B1 verification section. In case that several modules are interconnected to an arrangement, the switching logic is a) at the "first" module switched to pass via interface T6 (R6) the output of the B1 calculation to the next module within the arrangement; b) at an intermediate module switched to perform an XOR operation, with one operand being the output of the internal B1 calculation section and the second operand being the input received via the interface T7 (R7), and passing on the result of this XOR operation via the interface T6 (R6); and c) at the last module of an arrangement switched to perform an identical XOR operation, however, transmitting the result to the SOH insertion section or to the SOH extraction/B1 verification section, respectively.

For SONET/SDH signals higher then STM-1 (e.g. STM-4, STM-4c), the interfaces T4 and T5 represent the exchange of feedback information from and to the individual bit positions of the SONET/SDH frame synchronized parallel scrambler. Again without going into known details of frame synchronized scrambling, each scrambler or descrambler can be regarded as a register chain, wherein the contents of the registers are modulo-2 added an equal number of bits of the data stream. The contents of the registers is however also required as feedback to generate the register contents at the next clock cycle. Hence, the scrambler within each module requires in principle information concerning the register contents of registers of other modules when transforming signals larger than the 155 base signal (STM-1). As the register content however has a periodicity determined by the characteristic or generating polynomial, a reduced feedback scheme can be found which only requires the transmission of the register contents of one module.

Figure 5:
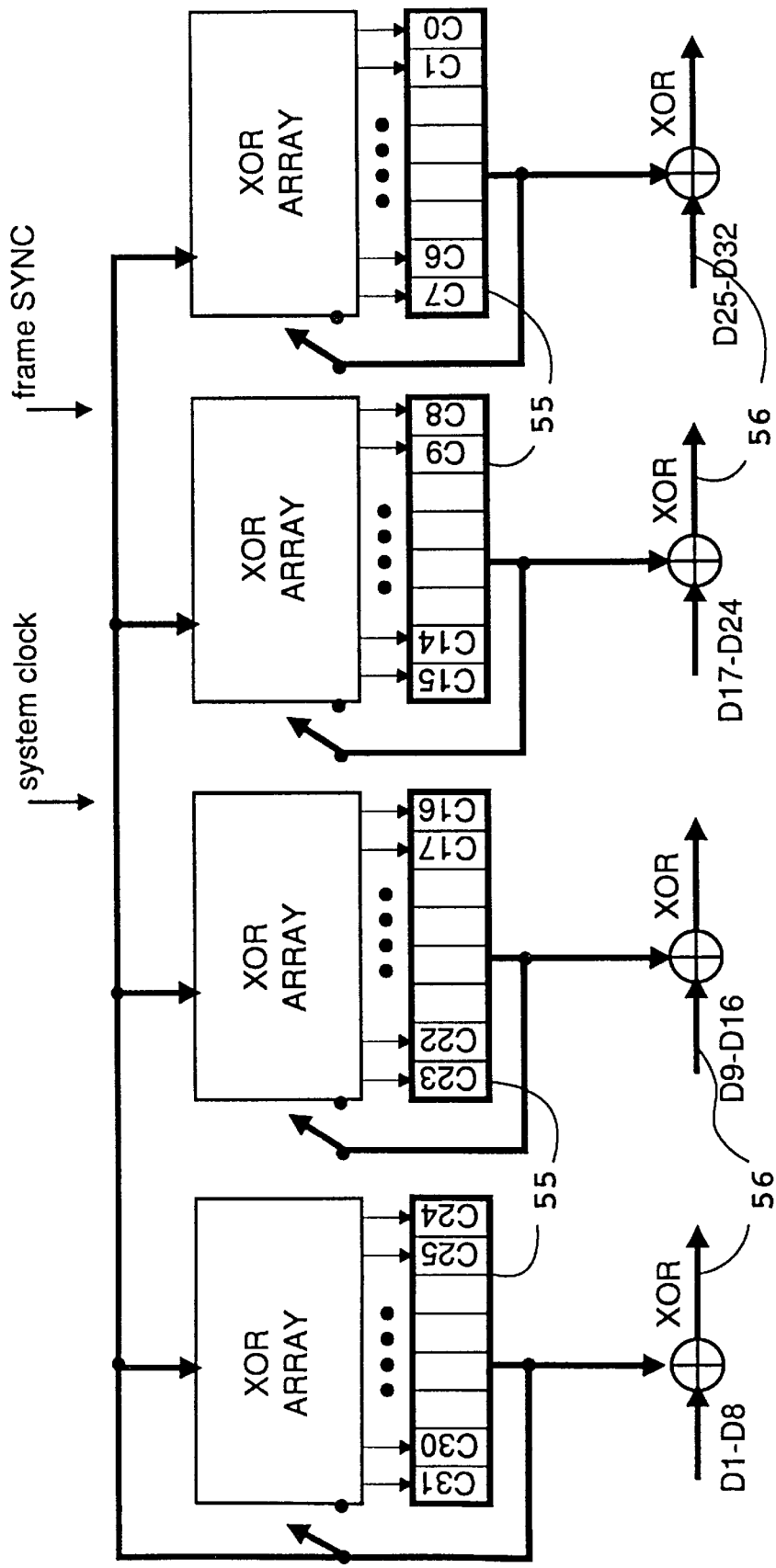
FIG. 5 shows details of the frame synchronized scrambling section

This scheme may be best clarified by referring to FIG. 5, which illustrates the scrambling in an arrangement of four modules, i.e., for the STM-4(c) case. The scrambling section of each module comprises a chain of eight registers 55, the contents of which is added in parallel to an 8 bit wide data stream 56. Furthermore, each module comprises an XOR ARRAY to which the contents C of the registers are connected to provide a feedback required by the scrambler. In the stand-alone mode, the XOR ARRAY receives input from the internal register chain, e.g. from C0–C7 for the module on the first module from the right. In case that a 32 bit wide data stream D0–D31 is processed by four parallel modules, this module receives the register contents of either all other modules, i.e., C8–C31, or, as explained above, from only one register chain, e.g., C24–C31. The latter is shown in the example of FIG. 5. The XOR ARRAY can be switched between different configurations. To provide different XOR array configurations for all possible arrangements, i.e., a combination of four, sixteen, and possibly more modules, within a module poses no problem to a person skilled in the art, as the number of such different arrangements is limited and the combinational logic behind the XOR array design is not very complex. For the polynomial $x^7+x^6+1$ and the feedback taken solely from byte (register C25–C31), the combinational functions, which define the layout of the XOR ARRAY, for each individual register input is given by the following set of equations:

C31,in=C25,out+C27,out+C28,out+C29,out
C30,in=C25,out+C26,out+C27,out+C28,out+C31,out
C29,in=C26,out+C27,out+C30,out+C31,out
C28,in=C25,out+C26,out+C29,out+C30,out
C27,in=C28,out+C29,out+C31
C26,in=C27,out+C28,out+C30,out
C25,in=C26,out+C27,out+C29,out
C24,in=C25,out+C26,out+C28,out
C23,in=C27,out+C31,out
C22,in=C26,out+C30,out
C21,in=C25,out+C29,out
C20,in=C25,out+C28,out+C31,out
C19,in=C25,out+C27,out+C30,out+C31,out
C18,in=C25,out+C26,out+C29,out+C30,out+C31,out
C17,in=C28,out+C29,out+C30,out+C31,out
C16,in=C27,out+C28,out+C29,out+C30,out
C15,in=C26,out+C27,out+C28,out+C29,out
C14,in=C25,out+C26,out+C27,out+C28,out
C13,in=C26,out+C27,out+C31,out
C12,in=C25,out+C26,out+C30,out
C11,in=C29,out+C31,out
C10,in=C28,out+C30,out
C9,in=C27,out+C29,out
C8,in=C26,out+C28,out
C7,in=C25,out+C27,out
C6,in=C25,out+C26,out+C31,out
C5,in=C30,out+C31,out
C4,in=C29,out+C30,out
C3,in=C28,out+C29,out
C2,in=C27,out+C28,out
C1,in=C26,out+C27,out
C0,in=C25,out+C26,out.

For the receiver, interfaces R4 and R5 handle the same information flow for SONET/SDH frame parallel frame synchronized descrambling.

The appropriate switching means of the intra-module functions to support these interfaces are seen as a second additional feature of the current invention. The registers of the modules are thus able to accept inputs from other Rx or Tx modules than itself. With these extensions, the base module can be configured as desired. In addition to the foregoing, different configurations will be described below when referring to specific arrangements of several modules.

A third additional feature consists of a synchronization port T8, R8 to exchange system clock and frame sync signals between the modules. The synchronization port includes configuration register which allows to choose between several operation modes: If Tx modules and hence a SONET/SDH line is available, a clock extraction circuitry provides the bit clock, the byte clock and the frame sync signal. These signal are then distributed to all mounted RX modules and their components. The clock extraction circuitry is placed between the optical-to-electrical signal conversion and the multiplexing device. The various clock signals, in particular the important frame sync signal, can be either distributed in parallel, i.e., simultaneously to the multiplexing device and to each module, or funnelled through one module of an arrangement, which in turn transmits the signal via the synchronization port to the other modules in either a parallel (point-to-multipoint) or a cascaded (point-to-point transmission between adjacent modules) manner. This latter modes may be regarded as master-slave modes. In the master-slave mode, the frame sync signal is received by each module with a delay time. As these delays are however fixed, their effect can easily be neutralized by appropriately preset timers, counters, or buffers ensuring a proper synchronization of the data flows of each module. The clock extracting may also be integrated into one of the modules. This alternative is however contrary to the modular approach which is the main aspect of the present invention.

Other clock operation modes include an internal oscillator circuit either mounted on the same board or chip as the modules or as part of the entire system, i.e. on a separate board. The different clock circuits are connected by switching means such that it is possible to substitute one for another in case of failure.

The combination of all these additional features permit the module to function in accordance with the invention, i.e. either alone or as part of an assembly of similar modules. These features are not shown by any of the known SONET/SDH interfaces discussed earlier in this application in connection with the prior art. The module itself remains standards compliant, it has however been given the capability of "team-working" together with other, like modules.

The module introduced in the preceding paragraphs is generic, i.e. it can be used to construct any SONET/SDH processor at any standardized SONET/SDH signal level. It is an important advantage of the current invention, that the clock speed (system clock) remains the same for all levels, i.e., 19.44 MHz even for STM-64 signals. Examples of SONET/SDH processors at the STM-4 and STM-16 levels are illustrated in FIGS. 6 to 9. The exact function of the inter-module interfaces and the modules' registers will be explained below. The abbreviation GSTM-1 will be used henceforth for the generic STM-1 modules according to the invention.

Function of the inventive modules in STM-1 mode:

In the arrangement of FIGS. 3A, B, the modules operate in the base STM-1 mode. In this mode the modules each work alone. To do this their switching device 11, 12 (13, 14) are set to the internal connection 3-1. All other other interface are set to a "IGNORE"-state The remaining interfaces are thus not considered in STM-1 mode operation. They can be left connected to other modules if the connections already exist: this has no effect on their function, provided that the switching elements are set appropriately.

Figure 1:
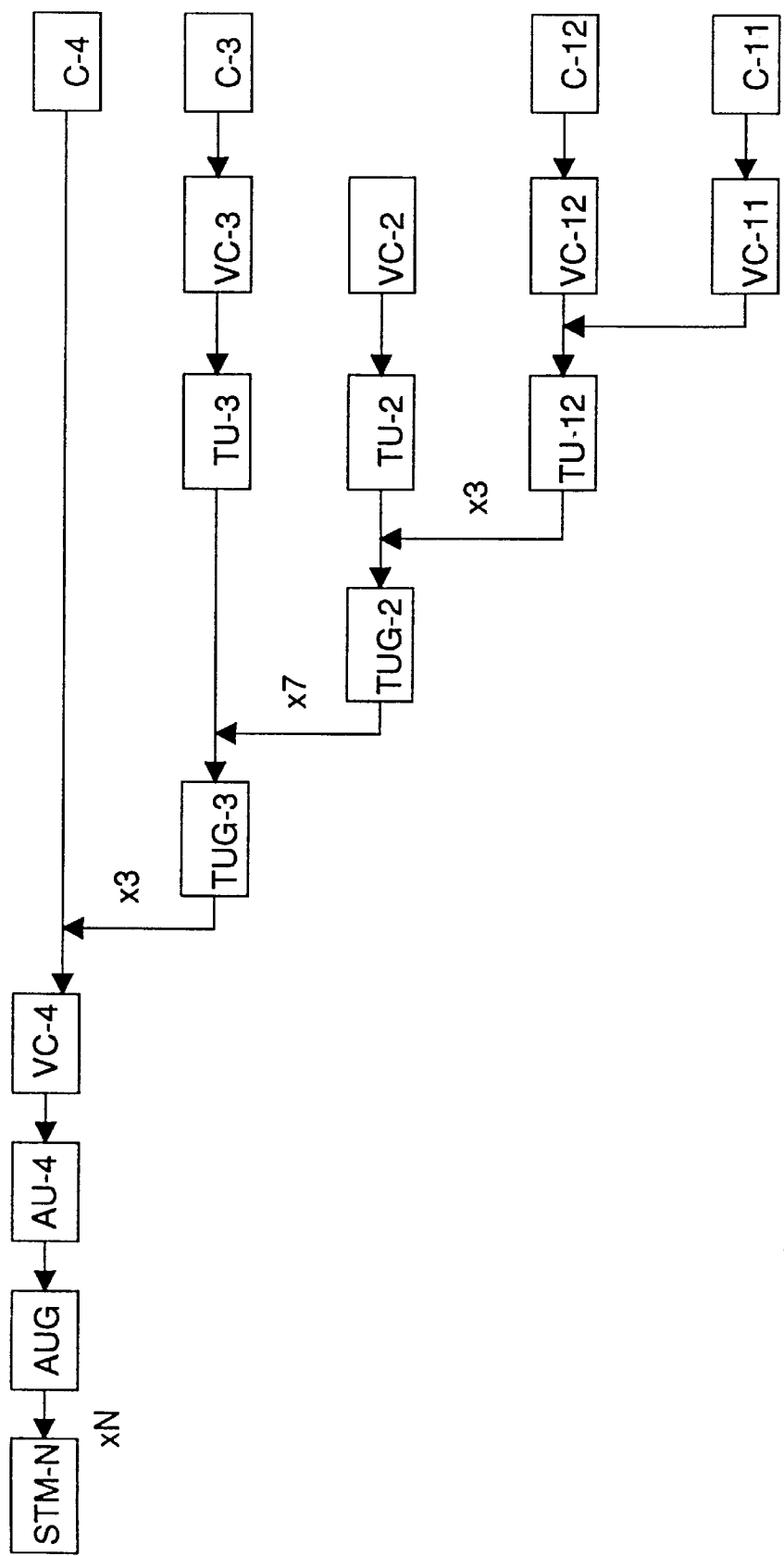
FIG. 1 shows an overview over the SDH signal hierarchy up to the STM-N signal.
Figure 2:
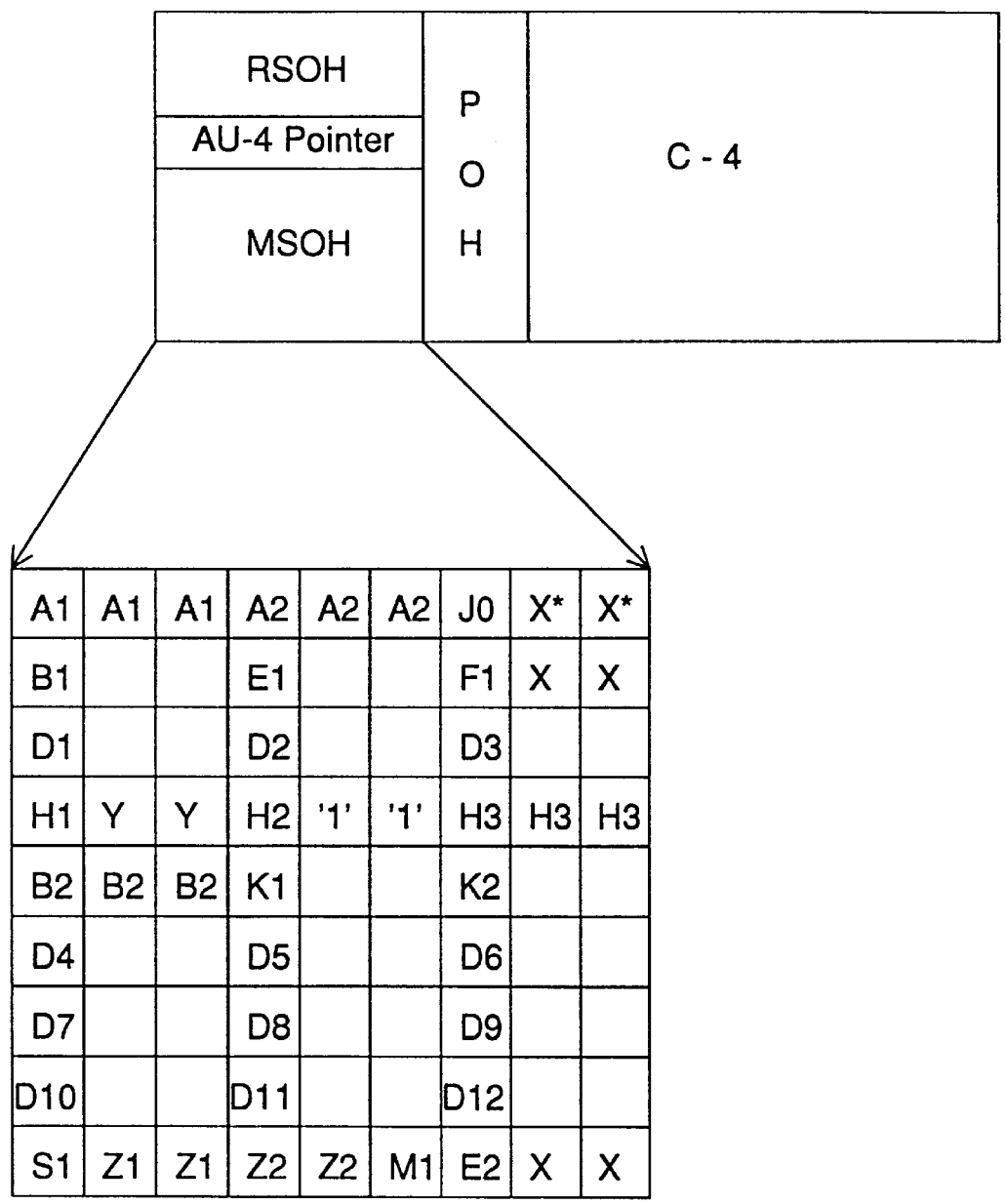
FIG. 2 shows a STM-1 signal with a VC-4 container according to standard provisions.
Figure 6:
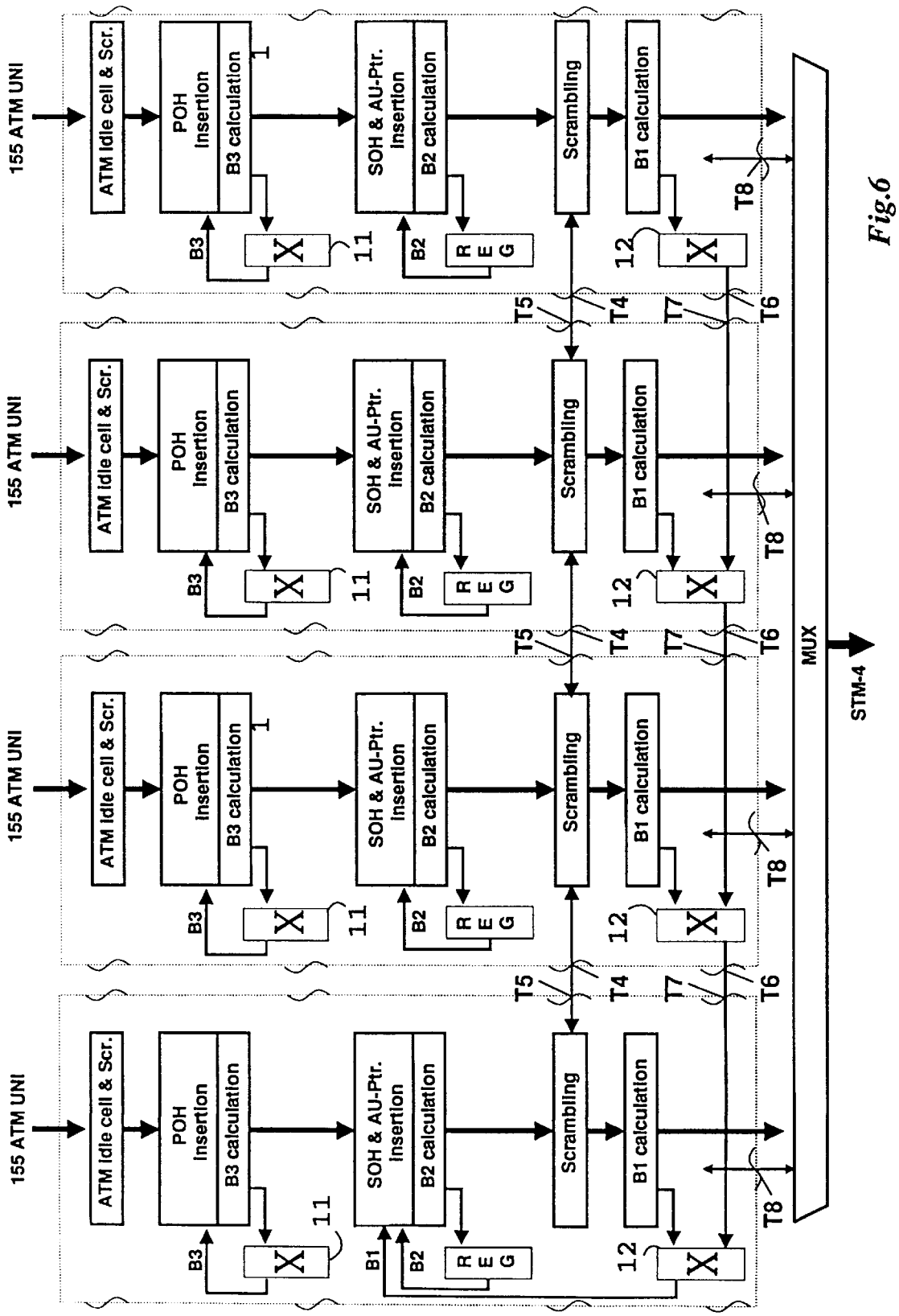
FIG. 6 shows an arrangement of four base modules for mapping four ATM-type tributaries into an STM-4 signal.

Function of the inventive modules in STM-4 mode:

In the STM-4 mode four GSTM-1 Tx-type modules are interconnected as is shown in FIG. 6: In this arrangement as well as in all following arrangements the modules are interconnected by the T4 and T5 interfaces to exchange scrambling data as described above. Also, the T6 interfaces of the second to fourth (from the left) GSTM-1 Tx modules are connected to the T7 interfaces of the first to the third GSTM-1 modules respectively. The corresponding switch configuration is 3-2 for the module on the right and 3-2/4-2 for the modules in the middle. The first GSTM-1 Tx module is connected according to the switch configuration 3-1/4-1, i.e., internally. In this configuration, the internal B1 calculation is no longer connected to the SOH insertion section in three modules. The internal B1 insertion is disabled in these. As explained above, a register chain is thereby established between the fourth and first GSTM-1 modules. In operation, the Bit-Interleaved Parity-8 bytes of the second to the fourth GSTM-1 modules are forwarded sequentially to the first GSTM-1 module. In GSTM-1 the Bit-Interleaved Parity-8 bytes are associatively XOR-ed. The result of this operation is a single byte, which is called the "B1" byte. The B1 byte is part of the section overhead of an STM-N signal. It resides in the part of the section overhead which is used by repeaters in the SONET/SDH network. This part of the overhead is the "Regenerator section overhead", see FIG. 2. The repeaters use this part of the section overhead to monitor the whole of the remaining SONET/SDH frame. The particular function of the B1 byte is to allow error monitoring in the STM-N signal. The B1 byte is calculated over all bits of the previous frame of the STM-N signal after it has been scrambled, and is included in the current STM-N frame prior to scrambling.

The time available for all byte shift and XOR operations involved in the calculation of the B1 byte is the time for the first row of the SONET/SDH frame to be transmitted. This is because it is necessary for the entire previous frame to have been transmitted so that the information for calculation of the B1 byte has passed through the GSTM-1 Tx modules, and, as the B1 byte is the first byte to be transmitted in the second row of the STM-4 frame, calculation of the B1 byte must be completed in time for the start of transmission of the second row of the frame. So calculation of the B1 byte can only occur in the time that the first row of the current frame of the STM-4 signal is being transmitted. This time is the time for the entire frame to be transmitted divided by the number of rows in the frame, i.e., 14 μs. Even for the STM-64 signal (9.6 Gb/s), the available time for one byte shift and XOR operation is still around 220 ns. This is clearly supported by today's CMOS technology. The modules triggered with a clock rate of around 19 MHz (50 ns) in fact could support even higher transmission rates.

In the arrangement of FIG. 6, the B1 byte is calculated by the "cascading" of Bit-interleaved Parity-8 bytes described above. The remainder of the Section Overhead is byte-multiplexed from the four STM-1 Section Overheads of the GSTM-1 modules. This is a simple multiplexing operation which can be carried out in the multiplexer which receives the outputs of the four GSTM-1 modules. The multiplexer is the only part of the arrangement of the present invention which has to operate data at the 622 Mbit/s STM-4 signal rate.

FIG. 6 shows an STM-4 Tx module. Analogously to this, four GSTM-1 Rx modules can be combined to receive an STM-4 signal, which thereby can be converted into individual tributary signals in the opposite procedure to that shown in FIG. 6.

Figure 7:
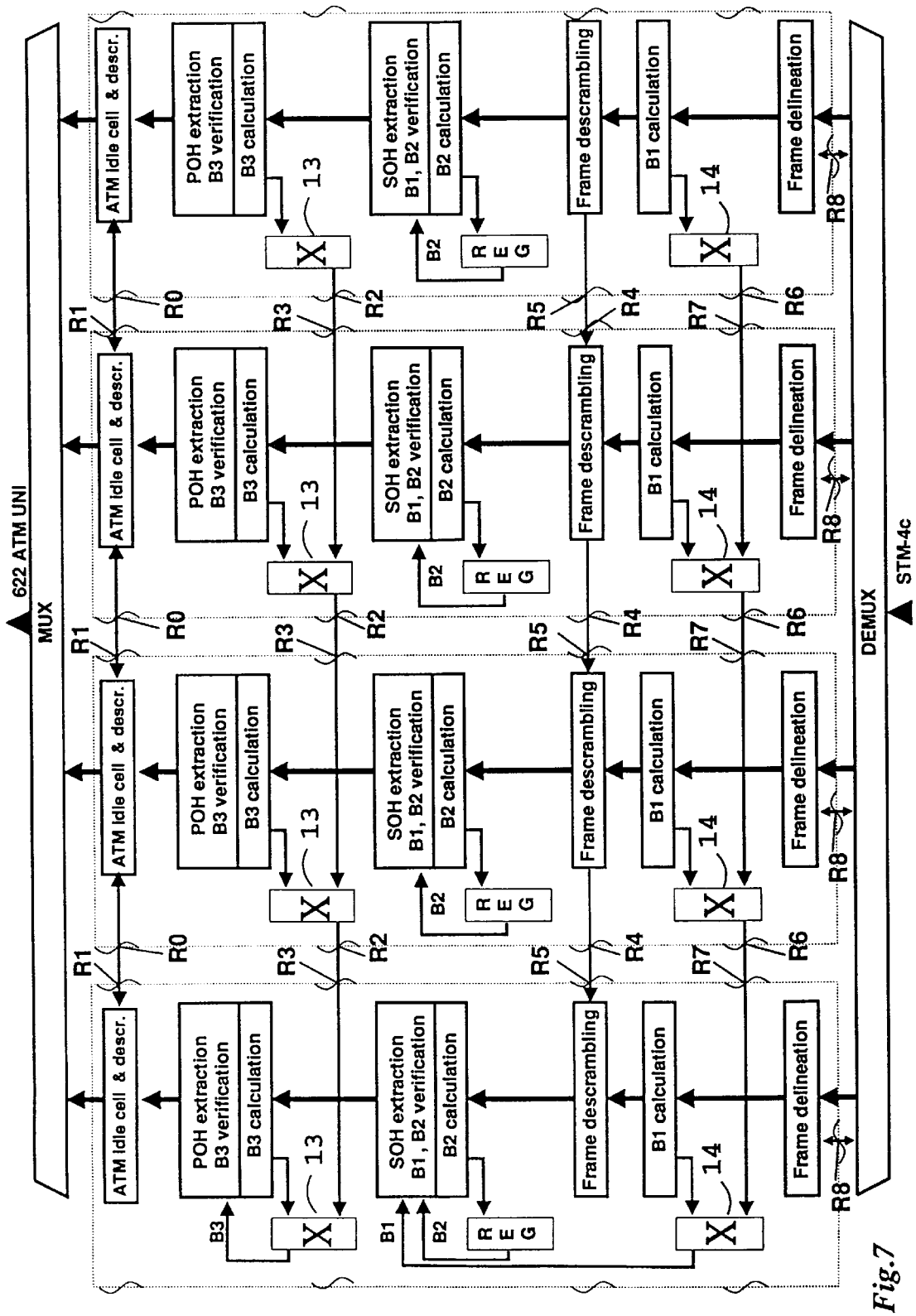
FIG. 7 shows an arrangement of four base modules for mapping an STM-4c signal into an ATM 622 Mbit/sec signal.

For converting an STM-4c signal into a single ATM cell stream with a data rate of 622 Mbit/s, an arrangement as shown in FIG. 7 can be employed. This arrangement receives a 622 Mbit/s STM-4c signal, and converts this to a 622 Mbit/s ATM signal. To do this, the STM-4c signal is:

(i) first demultiplexed down to four 155 Mbit/s data streams;

(ii) processed by four GSTM-1 Rx modules working in parallel, each of these having the construction described in connection with FIG. 3B (3A);

(iii) multiplexed into a single 622 Mbit/s ATM signal.

The STM-4c signal contains a single, concatenated payload. This payload is distributed over the four GSTM-1 Rx modules in the arrangement of FIG. 7.

In the STM-4c mode four GSTM-1 Rx-type modules are interconnected as is shown in FIG. 7: As already explained above, the interconnection by the R4 and R5 interfaces to exchange scrambling data remains unchanged. Also, the R6 interfaces of the second to fourth (from the left) GSTM-1 Rx modules are connected to the R7 interfaces of the first to the third GSTM-1 modules respectively. The corresponding switch 14 configuration is 3-2 for the module on the right and 3-2/4-2 for the modules in the middle. The first GSTM-1 Rx module is connected according to the switch configuration 3-1/4-1, i.e., internally. In this configuration, the internal B1 calculation is no longer connected to the SOH insertion section in three modules. The internal B1 insertion is disabled in these. As explained above, a register chain is thereby established between the fourth and first GSTM-1 modules. In operation, the Bit-Interleaved Parity-8 bytes of the second to the fourth GSTM-1 modules are forwarded sequentially to the first GSTM-1 module. In GSTM-1 the Bit-Interleaved Parity-8 bytes are associatively XOR-ed. The result of this operation is a single byte, which is called the "B1" byte. The calculated B1 byte is then compared to the one extracted from the SOH of the following STM-4c signal (frame).

The BIP-8 B3 byte protects the payload of the STM-4c signal and is part of the SONET/SDH standard. It is located within the virtual container for path error monitoring (POH) and is calculated over all the bits of the previous virtual container before scrambling. The resulting BIP-8 byte is placed in the B3 byte position of the current virtual container before scrambling. As for the BIP-8 B1 byte, the BIP B3 byte is part of the standard data frame format under SONET/SDH. But the current invention is unique as providing a way of to calculating the B3 also over several distinct modules. According to the arrangement of the invention shown in FIG. 7 of the present application, the BIP-8 B3 byte is assembled from the B3 bytes of all the GSTM-1 Rx modules. The calculation of the BIP-8 B3 byte is analogous to the calculation of the BIP-8 B1 byte.

In this arrangement the modules are interconnected by the R2 and R3 interfaces to perform the B3 calculation and checking. The R2 interfaces of the second to fourth (from the left) GSTM-1 Rx modules are connected to the R3 interfaces of the first to the third GSTM-1 modules respectively. The corresponding switch configuration is 3-2 for the module on the right and 3-2/4-2 for the modules in the middle. The first GSTM-1 Rx module is connected according to the switch configuration 3-1/4-1, i.e., internally. In this configuration, the internal 63 calculation is no longer connected to the SOH insertion section in three modules. The internal B3 insertion is disabled in these. As explained above, a register chain is thereby established between the fourth and first GSTM-1 modules. In operation, the Bit-Interleaved Parity-8 bytes of the second to the fourth GSTM-1 modules are forwarded sequentially to the first GSTM-1 module. In GSTM-1 the Bit-Interleaved Parity-8 bytes are associatively XOR-ed.

The result of this operation is a single byte, which is called the "B3" byte. The calculated B3 byte is then compared to the one extracted from the POH of the following STM-4c signal (frame).

In this arrangement, the frame scrambling sections interfaces R4, R5 are also connected for the exchange of register contents as described above.

In the STM-4c receiver of FIG. 7, the modules are also connected by the interfaces of the ATM section, R0 and R1. The R0 interfaces of the second to the fourth GSTM-1 Rx modules are connected to the R1 interfaces of the first to the third GSTM-1 Rx modules respectively. The function of these interface is described above with reference to FIGS. 4A and 4B.

Finally, the individual GSTM-1 Rx modules of FIG. 7 have their R8 interfaces connected to a demultiplexer (DEMUX). These R8 interfaces supports the detection and frame alignment process carried out by detecting the transition of the A1 to the A2 byte of the Section Overhead. When all four frame delineation subfunctions in the GSTM-1 modules indicate that they have detected the A1 to A2 transition at their R8 interfaces, the STM-4c frame is delineated. This scheme allows the usage of a demultiplexer stage without any SONET/SDH related functions. Nevertheless, the demultiplexer must be capable to perform bit shift operations on demand via the R8 interfaces until byte and frame alignment is achieved. However, the modularity of the invention persists even when the demultiplexer performs the byte and frame alignment functions (e.g. by a serial shift register and appropriate comparators). In this case, the interface R8 can be reduced to control signals initializing the frame alignment hunting process in the demultiplexer and status signals indicating frame alignment.

All operations of the module are synchronized via a clock bus T8,R8, by which the first (master) module transmits the frame sync to the following (slave) modules. It should be noted that the frame sync signal can be derived from the system clock signal without having to synchronize the modules on the arrival of specific bytes of the STM payload.

Figure 8:
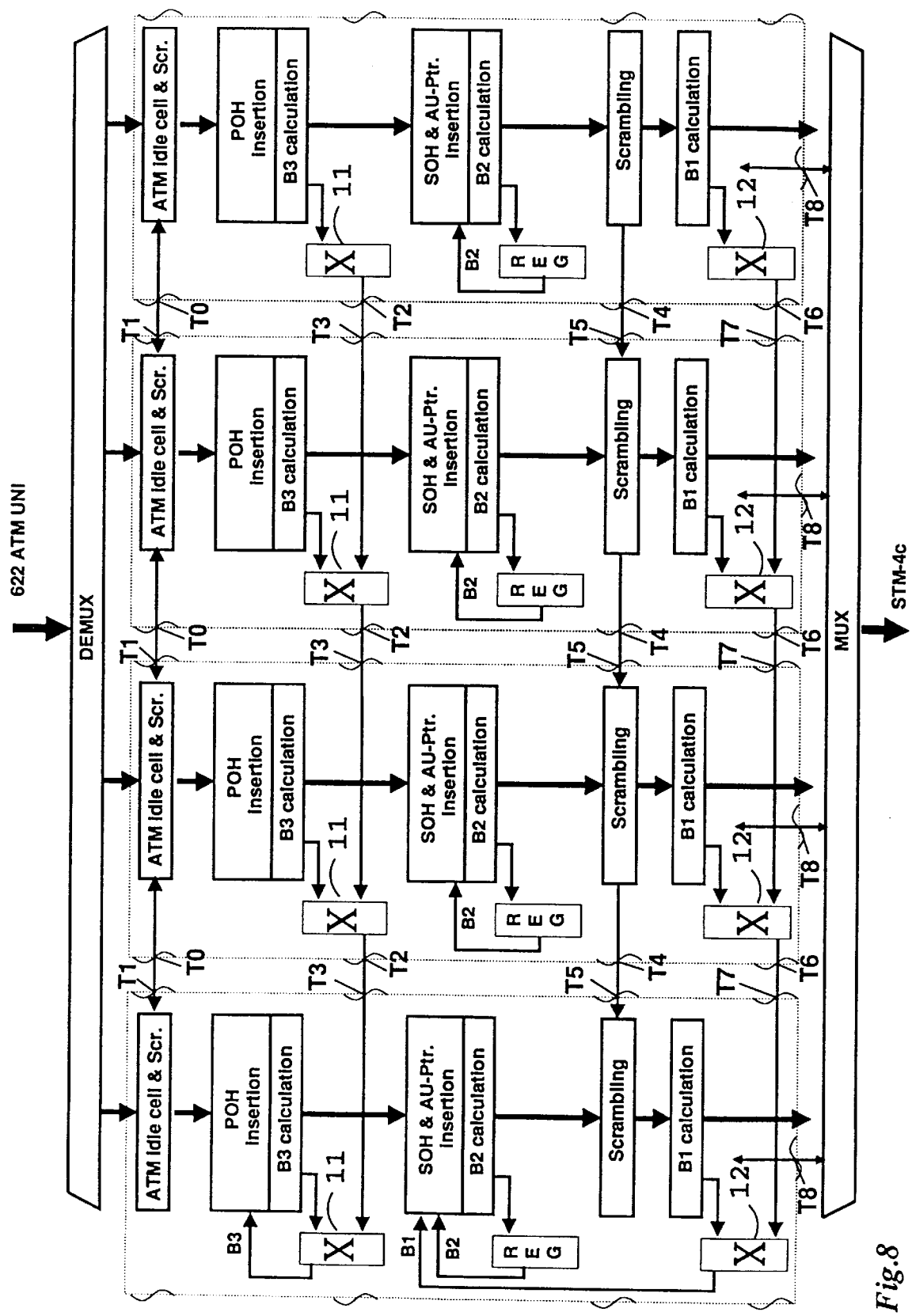
FIG. 8 shows an arrangement of four base modules for mapping an ATM 622 Mbit/sec signal into an STM-4c signal.

FIG. 8 shows an STM-4c transmitter. The function of this arrangement is similar to that of the receiver of FIG. 7, differing principally in that the STM-4c signal is being created. To clarify the role of the demultiplexer, it should be borne in mind that the 622 Mbit/s ATM data stream consists of a sequence of bytes. These bytes are distributed cyclically to the four GSTM-1 Tx modules in sequence by the demultiplexer. Thus the first, fifth, ninth etc. bytes of the ATM data stream are delivered to the first GSTM-1 Tx module. It is therefore clear that the data to be inserted in the Virtual Container of the SDH signal is broken up and distributed amongst the four GSTM-1 Tx modules. However, the BIP-8 B1 byte can still be calculated by the arrangement of the invention shown in FIG. 8, because the results of the B1 evaluation function performed in each of the four GSTM-1 Tx modules are brought together by the connection of the T6 and T7 interfaces as shown. Similarly for the combination via the T2, T3 connections of the results of the separate B3 byte calculations performed in the four GSTM-1 Tx modules.

It should be noted that the BIP-8 B1 byte is calculated for all STM-N signals. However, the BIP-8 B3 byte is only calculated for concatenated signals according to the SONET/SDH standard, as it is designed to protect the payload of concatenated signals.

Figure 9:
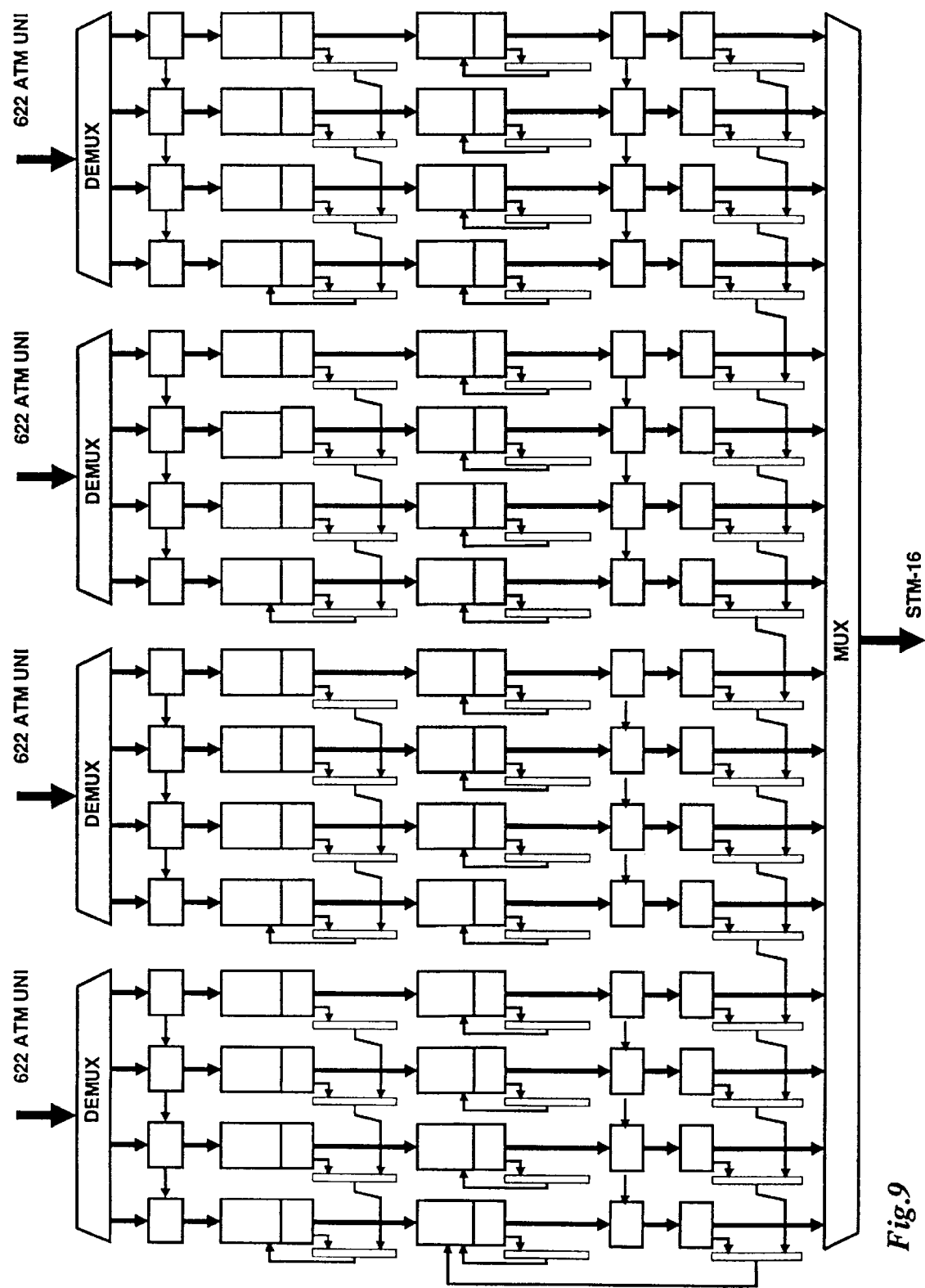
FIG. 9 shows an arrangement of 16 base modules for mapping four ATM 622 Mbit/sec signal into an STM-16 signal.

The arrangement of FIG. 9 shows an STM-16 transmitter constructed using the modules of the invention. Due to the format of the figure, most of the numerals and other identifying labels are omitted as all components have been already described above, consequently only the interconnection of the sections of the modules as such offers further information.

This circuit multiplexes four STM-4c signals. There are four STM-4c transmitters in this arrangement, with the B1 register chain extending over all sixteen GSTM-1 modules. The BIP-8 B1 byte calculated by this register chain thus covers each and every bit of the STM-16 frame. A similar setup could be used to map 16 ATM data stream of each 155 Mbit/s into one STM-16 signal. In this arrangement, no multiplexing is required at the ATM side.

It should be noted that in the arrangement of FIG. 9 all sixteen of the GSTM-1 Tx modules operate at the same clock rate as do GSTM-1 modules which interface signals into and out of the other SONET/SDH signal levels. It is once more only the multiplexer and the demultiplexers which must operate at higher data rates than 155 Mbit/s. In this example the single multiplexer operates at 2.488 Mbit/s, and the four demultiplexers operate at 622 Mbit/s.

The examples of FIGS. 6–9 demonstrate how to scale GSTM-1 Tx and Rx modules to higher order SONET/SDH signals. It is important to note that in arrangements for the treatment of higher order SONET/SDH signals in accordance with the present invention, the GSTM-1 modules' clock rate is the same as when they are operated alone. This parallel operation of the modules increases the data path width of the arrangement and, thus, the throughput of the system. The conversion to the speed rate of the particular higher order SONET/SDH signal is performed in a multiplexer stage that is not part of the GSTM-1 architecture. The multiplexer and/or the demultiplexer on the SDH/SONET side is the only component of the arrangement which runs at the full speed of the higher order SONET/SDH signal. The complex control functions associated with the SONET/SDH data frames can thus be considered to be distributed over the parallel GSTM-1 modules, obviating the need for any additional stage providing SONET/SDH functions.

Quite clearly a receiver for STM-16 or STM-16c can be constructed in a manner analogous to that shown in FIG. 9. Likewise both transmitters and receivers for STM-64 can be constructed in accordance with the invention by further duplication of the basic arrangement of GSTM-1 modules. Their interfaces must be connected analogously to the schemes shown in FIGS. 6–9 of the present application.

The invention can also be extended to basic modules which have lower clocking speeds than the 155 Mbit/s used as an example in the present application. For instance, modules can be constructed which have as their clocking rate that appropriate for the SONET STS-1 signal level. Three such modules connected analogously to the arrangements of FIGS. 6–9 could then provide an interface to the STM-1 signal level. Such STS-1 modules would have a 51.84 Mbit/s clocking rate. In fact, any tributary data stream can be interfaced to an STM-N data stream by an arrangement of the correct number of modules which have the clocking rate of that tributary data stream.

What is claimed is:

1. A data processing module for mapping data signals to and from a standard data frame signal, said module comprising:

a header insertion and extraction means;

a scrambling means;

a means for determining the value of at least two error detection signals;

a first switching means having at least two interfaces connectable to adjacent modules for receiving and transmitting signals related to a first of said two error detection signals;

a second switching means having at least two interfaces connectable to adjacent modules for receiving and transmitting signals related to a second of said two error detection signals;

a synchronization port connectable to adjacent modules, for transmitting a frame synchronized signal; and interfaces for connecting said scrambling means to scrambling means of adjacent modules.

2. The module of claim 1, further comprising an ATM adapter section for scrambling or descrambling ATM cell payloads, said section having interfaces for connections to ATM adapter sections of adjacent modules.

3. A telecommunications processor comprising:

a plurality of data processing modules, each data processing module having a header insertion and extraction means, a scrambling means with at least two interfaces for connecting said scrambling means to scrambling means of adjacent modules; a means for determining the value of at least two error detection signals; a first switching means having at least two interfaces connectable to adjacent modules for receiving and transmitting signals related to a first of said two error detection signals; a second switching means having at least two interfaces connectable to adjacent modules for receiving and transmitting signals related to a second of said two error detection signals; a synchronization port connectable to adjacent modules for transmitting a frame synchronized signal; and, a multiplexing means for interleaving the data signals of said modules.

4. The telecommunications processor of claim 3 wherein the plurality of data processing modules have an equal clock speed, said clock speed being lower than the one for operating said multiplexing means.

5. The telecommunications processor of claim 4 wherein the plurality of data processing modules each having an ATM adapter section for scrambling or descrambling ATM cell payloads, said section having interfaces for connections to ATM adapter sections of adjacent modules.

* * * * *